United States Patent [19]

Matsumoto et al.

[11] 4,160,491
[45] Jul. 10, 1979

[54] PERLITE SOUND ABSORBING PLATE AND SOUND INSULATING WALL COMPOSED OF THE SAME

[75] Inventors: Masayasu Matsumoto, Zushi; Susumu Sakamoto, Yokohama; Nobufumi Matsudaira, Zushi; Kazuyoshi Iida, Yokohama; Yoshikazu Kondo, Tokyo; Kazuo Kondo, Yokohama; Haruo Watanabe, Chigasaki; Shosuke Suzuki, Zushi; Yasushi Onizaki, Yokohama, all of Japan

[73] Assignee: Bridgestone Tire Co., Ltd., Tokyo, Japan

[21] Appl. No.: 928,030

[22] Filed: Jul. 25, 1978

[51] Int. Cl.$^2$ .......................... E04B 1/82; C04B 43/00
[52] U.S. Cl. ................................. 181/284; 181/286; 181/293; 181/294; 106/90; 106/97; 106/DIG. 2
[58] Field of Search .................. 181/210, 284–286, 181/288–294, 296; 52/144, 145; 106/76, 88, 90, 97, DIG. 2; 428/403, 404

[56] References Cited

U.S. PATENT DOCUMENTS

| | | | |
|---|---|---|---|
| 1,804,884 | 5/1931 | Mager | 52/144 |
| 1,940,528 | 12/1933 | Bond | 106/90 |
| 2,634,207 | 4/1953 | Miscall et al. | 181/294 |
| 2,695,669 | 11/1954 | Sidwell | 106/DIG. 2 |
| 2,858,227 | 10/1958 | Rodsky et al. | 106/97 |
| 2,921,862 | 1/1960 | Sucetti | 106/88 |
| 3,095,347 | 6/1963 | Becker | 181/286 |
| 3,847,633 | 11/1974 | Race | 106/97 |
| 3,952,830 | 4/1976 | Oshida et al. | 181/294 |
| 4,042,406 | 8/1977 | Goay | 106/90 |

*Primary Examiner*—L. T. Hix
*Assistant Examiner*—Benjamin R. Fuller
*Attorney, Agent, or Firm*—Sughrue, Rothwell, Mion, Zinn and Macpeak

[57] ABSTRACT

A perlite sound absorbing plate and a sound insulating wall constructed by arranging a number of said plates side by side and by assembling together into one integral body are disclosed. The plate is composed of a mixture including 1,000 cm$^3$ by bulk volume of formed perlite particles each having a diameter of 0.1 to 7.0 mm, 100 to 140 g of cement, liquid rubber latex containing 5 to 20 g of solid ingredients and a suitable amount of water and produced by press molding with a compression ratio of 1.10 to 1.30. The wall is constructed by assembling a number of said plates each provided with a side groove with the aid of supporting columns and reinforcing plates, each having a ridge adapted to be engaged with the side groove of said plate.

7 Claims, 17 Drawing Figures

FIG_7

FIG_8

FIG_17

PERLITE SOUND ABSORBING PLATE AND SOUND INSULATING WALL COMPOSED OF THE SAME

BACKGROUND OF THE INVENTION

1. Field of the Invention

This invention relates to a perlite sound absorbing plate composed of an aggregate formed of foamed perlite particles, bonding agent formed of cement and liquid rubber latex and having an excellent sound absorbing property and capability of preventing the sound absorbing property from deteriorating under water absorbed condition and a sound insulating wall constructed by arranging a number of said perlite sound absorbing plates side by side and by assembling together them into one integral body.

2. Description of the Prior Art

A porous sound absorbing material containing a lightweight aggregate has recently been used as a sound absorbing material for preventing public nuisance caused by noises. Some of these porous sound absorbing materials makes use of a main aggregate formed of perlite. Such sound absorbing material containing the main lightweight aggregate formed of perlite can eliminate the drawback of less durability which has been encountered with the prior art sound absorbing material formed of textile such as glass wool, rock wool or the like and can be set in place without using any box-shaped flame.

The foamed perlite particles are an aggregate which is significantly light in weight. As a result, the foamed perlite particles have been expected to be used as the sound absorbing material. In addition, it has been ascertained that the porous sound absorbing material can be obtained by bonding the foamed perlite particles by means of a bonding agent.

The inorganic textile sound absorbing material exhibits a high acoustic absorptivity of at least 80% over a wide frequency range. The sound absorbing material containing the lightweight aggregate such as perlite or the like, however, could not exhibit such a high acoustic absorptivity. In addition, the sound absorbing material containing the lightweight aggregate such as perlite or the like could not recover lost sound absorbing property under the water absorbed condition due to rain or the like when the material is used outdoors.

The inventors have recognized the above mentioned drawback of the perlite sound absorbing material and developed a novel perlite sound absorbing plate which makes use of cement as its bonding agent and which can exhibit a high acoustic absorptivity over a wide frequency range even under a water absorbed condition.

The cement bonding agent has water absorbing and retaining property which is higher than that of any other organic or inorganic bonding agents and hence causes the sound absorbing property of the perlite sound absorbing material to deteriorate. In addition, the cement bonding agent has a large specific gravity which makes the perlite sound absorbing material inconvenient in handling. Moreover, the perlite sound absorbing plate containing the cement bonding agent is difficult to be molded, and as a result, such sound absorbing plate could not be used in practice at present.

SUMMARY OF THE INVENTION

An object of the invention, therefore, is to provide a perlite sound absorbing plate containing a cement bonding agent which can exhibit a high sound absorbing property of at least 70% over a wide frequency range of 0.5 to 2.0 KHz recognized as a public nuisance caused by noises under both dry and water absorbed conditions.

Another object of the invention is to provide a sound insulating wall constructed by arranging a number of the above mentioned perlite sound absorbing plates side by side and by assembling together into one integral body without using any bonding agent and which can be set in place with a minimum of time and labour.

A feature of the invention is the provision of a perlite sound absorbing plate composed of a mixture including 1,000 cm$^3$ by bulk volume of foamed perlite particles each having a diameter of 0.1 mm to 7.0 mm, 100 to 140 g of cement, liquid rubber latex containing 5 to 20 g of solid ingredients and a suitable amount of water and produced by agitating said mixture, charging said agitated mixture into a desired metal mold, press molding with a compression ratio of 1.10 to 1.30 to form a molded plate and curing and hardening said molded plate into a final plate.

Another feature of the invention is the provision of the above mentioned perlite sound absorbing plate which is provided with a number of different kinds of sound absorbing cavities each having a diameter from 20 to 50 mm and a depth from 30 to 90 mm, a ratio of the total area of said cavities to the total area of said sound absorbing plate being at most 40%.

A further feature of the invention is the provision of the above mentioned perlite sound absorbing plate which is provided at its sound incident side surface with a surface reinforcing layer composed of a reinforcing aggregate mainly consisting of expanded shale having a bulk specific gravity of 0.7 to 1.5 and bonded with said perlite sound absorbing plate by an inorganic bonding agent and after hardening made integral with said perlite sound absorbing plate.

A still further feature of the invention is the provision of a perlite sound absorbing plate composed of a mixture including 1,000 cm$^3$ by bulk volume of an aggregate produced by mixing expanded shale particles each having a diameter of 0.1 to 5 mm with foamed perlite particles each having a diameter of 0.1 to 7 mm with a bulk ratio of 0.4 to 2.5, 120 to 160 g of cement, liquid rubber latex containing 5 to 20 g of solid ingredients and a suitable amount of water and produced by agitating said mixture, charging said agitated mixture into a desired metal mold and press molding to form a molded plate and curing and hardening said molded plate into a final plate.

Another feature of the invention is the provision of the last mentioned perlite sound absorbing plate which is provided with a number of different kinds of sound absorbing cavities each having a diameter from 20 to 50 mm and a depth from 30 to 90 mm, a ratio of the total area of said cavities to the total area of said sound absorbing plate being at most 40%.

Another feature of the invention is the provision of a sound insulating wall comprising a plurality of equally spaced apart and vertically extending end and intermediate supporting columns each having a lower portion embedded in foundation ground and provided at its at least one side surface with a groove, a number of perlite sound absorbing plates each provided at its side surfaces with a side groove and arranged side by side in both horizontal and vertical directions, a plurality of equally spaced apart and horizontally extending upper, intermediate and lower reinforcing plates each provided at its at least one surface with a ridge engaged with said side groove of said perlite sound absorbing plate and at its both ends with projections engaged with said groove of said supporting column, said perlite sound absorbing plates being arranged side by side directly between said supporting columns in horizontal direction and through said intermediate reinforcing plates between said upper and lower reinforcing plates in vertical direction, and being composed of a mixture including 1,000 cm$^3$ by bulk volume of foamed perlite particles each having a diameter of 0.1 to 7.0 mm, 100 to 140 g of cement, liquid rubber latex containing 5 to 20 g of solid ingredients and a suitable amount of water and produced by agitating said mixture, charging said agitated mixture into a desired metal mold, press molding with a compression ratio of 1.10 to 1.30 to form a molded plate and curing and hardening said molded plate into a final plate.

Another feature of the invention is the provision of the above mentioned sound insulating wall wherein said perlite sound absorbing plate is composed of a mixture including 1,000 cm$^3$ by bulk volume of an aggregate produced by mixing expanded shale particles each having a diameter of 0.1 to 5 mm with foamed perlite particles each having a diameter of 0.1 to 7 mm with a bulk ratio of 0.4 to 2.5, 120 to 160 g of cement, liquid rubber latex containing 5 to 20 g of solid ingredients and a suitable amount of water and produced by agitating said mixture, charging said agitated mixture into a desired metal mold and press molding to form a molded plate and curing and hardening said molded plate into a final plate.

DETAILED DESCRIPTION OF THE PREFERRED EMBODIMENTS

Figure 1:
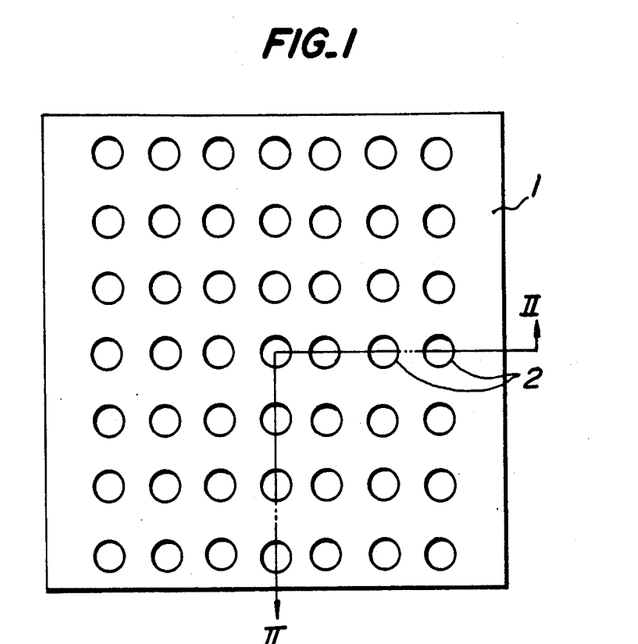
FIG. 1 is a front elevational view of one embodiment of a sound absorbing plate according to the invention.
Figure 2:
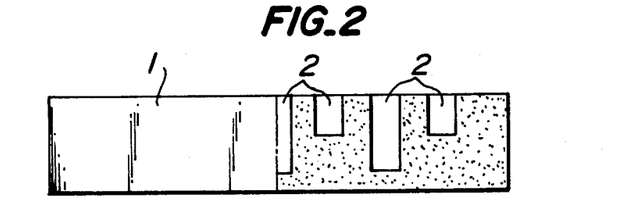
FIG. 2 is a cross-sectional view taken along the line II—II of FIG. 1.

The invention will now be described in greater detail with reference to the accompanying drawings. FIG. 1 is a front elevational view of one embodiment of a perlite sound absorbing plate according to the invention and FIG. 2 is a cross-sectional view taken along the line II—II of FIG. 1. A perlite sound absorbing plate 1 shown in FIGS. 1 and 2 has a dimension of 500 mm (length)×500 mm (width)×100 mm (thickness). The perlite sound absorbing plate 1 is provided at its sound incident surface with a plurality of cavities 2 having a diameter selected within a range between 20 mm and 50 mm and a depth selected within a range between 30 mm and 90 mm. In the present embodiment, provision is made of two kinds of cavities 2 having dimensions of 30 (diameter)×40 mm (depth) and 30 mm (diameter)×80 mm (depth). A ratio of the total area of cavities 2 to the total surface area of the perlite sound absorbing plate 1 is made at most 40%.

The thickness of the perlite sound absorbing plate 1 is dependent particularly on the level of acoustic absorptivity of the perlite sound absorbing plate 1. The thicker the perlite sound absorbing plate 1 is the better acoustic absorptivity thereof is obtained. But, the upper limit of the thickness of the perlite sound absorbing plate 1 is determined to the order of 120 mm by taking the manufacturing cost or the like into consideration, while the lower limit thereof is determined to 80 mm which is required for exhibiting a high acoustic absorptivity over a wide frequency range.

If all of the sound absorbing cavities 2 are made the same and small in depth, the sound absorbing effect due to the presence of such sound absorbing cavities 2 is exhibited over the high frequency range, while the sound absorbing effect due to the quality of the constitutional material of the perlite sound absorbing plate is exhibited over the low frequency range, so that the acoustic absorptivity becomes degraded over the intermediate frequency range.

On the contrary, if all of the sound absorbing cavities are made the same and large in depth, the sound absorbing effect due to the presence of such sound absorbing cavities 2 is exhibited over the low frequency range, and as a result, it is possible to avoid the degradation of the acoustic absorptivity over the intermediate frequency range. But, the perlite sound absorbing plate becomes small in volume, so that the sound absorbing effect due to the quality of the constitutional material of the perlite sound absorbing plate becomes degraded particularly under the water absorbed condition.

Experimental tests have yielded the result that the combination of two different kinds of sound absorbing cavities of 30 mm (diameter)×40 mm (depth) and 30 mm (diameter)×80 mm (depth) shown in FIGS. 1 and 2 is the optimum in acoustic absorptivity.

In the present invention, it is preferable to use as the foamed perlite particles foamed obsidian particles each having a particle diameter of 0.1 to 7 mm. It is the most preferable to distribute the foamed perlite particles with particle size whose center particle diameter is 3.5 mm. If substantially all of particle diameters are at most 2.8 mm, the gap between the particles becomes decreased, and as a result, the acoustic absorptivity over the low frequency range becomes degraded and the water absorptivity under the water absorbed condition becomes extremely increased, thereby degrading the acoustic absorptivity.

If substantially all of particle diameters are at least 4 mm, the use of the material having a large foaming factor causes the sound absorbing plate to degrade its mechanical strength. In addition, the presence of excessively large gap between the particles results in decrease of the acoustic absorptivity. The large foaming factor increases the water absorptivity, thereby degrading the acoustic absorptivity under the water absorbed condition.

In the present invention, the perlite particles each having a diameter limited as above described are mixed with cement and liquid rubber latex to be described later and compressed under the optimum condition within a range of compression ratio between 1.10 and 1.30, thereby providing a perlite sound absorbing plate having a preferable gap between particles and high acoustic absorptivity. 100 to 140 g of cement for bonding together the perlite particles is mixed with 1,000 cm$_3$ by bulk volume of the perlite particles. If the amount of cement is smaller than 100 g, the bonding force between the particles becomes decreased, thereby degrading the mechanical strength of the perlite sound absorbing plate. In addition, the acoustic absorptivity over a high frequency range of higher than 1.0 KHz becomes degraded. If the amount of cement is larger than 140 g, the gap between the perlite particles is decreased, and as a result, the water retaining property and the increased water absorptivity cause the acoustic absorptivity over the low frequency range to considerably decrease.

In the present invention, the liquid rubber latex is added to the perlite particles such that the solid ingredients of the liquid rubber latex becomes 5 to 20 g. The liquid rubber latex used under such condition functions to prevent the degradation of the acoustic absorptivity of the perlite sound absorbing plate over the low frequency region under the water absorbed condition. That is, the liquid rubber latex added functions to accelerate removal of water content from the perlite sound absorbing plate which has absorbed water and decrease the water retaining factor of the cement, thereby preventing the rate of decreasing the gap between the perlite particles. Some kind of rubber latex functions to increase the bonding force between the perlite particles and hence increase the mechanical strength of the perlite sound absorbing plate.

If the amount of rubber latex is made large, the water absorbing factor of the perlite sound absorbing plate becomes decreased and the acoustic absorptivity over the low frequency range under the water absorbed condition becomes less decreased. It is necessary to define a proper amount of rubber latex to be added. In general, it is preferable to make the amount of rubber latex small and make the amount of cement large in order to prevent the acoustic absorptivity from degrading. But, it is preferable to make the amount of cement small and make the amount of rubber latex large in order to improve the acoustic absorptivity over the low frequency range.

In the case of forming the perlite sound absorbing plate, according to the present embodiment, in the first place, to perlite particles is added cement to provide a mixture to which is then added rubber latex diluted with a suitable amount of water to obtain a mixed material. This mixed material is charged into a desired metal mold and then press molded to form a plate-shaped body. It is preferable to charge the mixed material into an oscillating metal mold. For this purpose, the metal mold may be mounted on an oscillating table or connected to an oscillating machine. An excessively large amount of the mixed material is charged into the metal mold such that a compression ratio of 1.10 to 1.30 times the volume of the sound absorbing plate is obtained. During the press molding, if the pressure is applied to the rear surface of the perlite sound absorbing plate or that surface of the perlite sound absorbing plate which is opposed to the sound incident surface, it is possible to form a perlite sound absorbing plate having the optimum gap between the particles and a high acoustic absorptivity over a wide frequency range.

The molded plate thus obtained is cured under humid air or steam vapor and hardened into a perlite sound absorbing plate.

As can be seen from the above, the conventional perlite sound absorbing plate which makes use of cement as its bonding agent could not be used in practice owing to its drawbacks inherent thereto. In order to eliminate such drawbacks, the inventors have succeeded to improve the quality of the perlite sound absorbing plate by suitably selecting a composition ratio and compression ratio of the raw materials and configuration of articles obtained, thereby producing a perlite sound absorbing plate having a high acoustic absorptivity over a wide frequency range and adapted to be used instead of an inorganic textile sound absorbing material and set in place with a minimum of time and labour.

The embodiment shown in FIGS. 1 and 2 will now be described with reference to the following example 1.

EXAMPLE 1

Various kinds of sound absorbing plates each having a thickness of 100 mm were produced from compositions shown in the following Table 1. Each plate is provided at its upper surface with a plurality of sound absorbing cavities having different dimenions of 30 mm (diameter)×40 mm (depth) and 30 mm (diameters×80 mm (depth). A columnar body of 97 mm (diameter)×100 mm (thickness) and provided about its center with said two sound absorbing cavities was cut out of the plate. The acoustic absorptivity of sound incident in a direction perpendicular to the upper surface of the columnar body was measured and the result thus obtained is shown in the following Table 2. The mixed materials were charged into an oscillatory metal mold and subjected to press molding and then immediately removed out of the metal mold. The product thus molded was cured in steam vapor at 90° C. for 3 hours to obtain a hardened plate.

Table 1

|  | Sample No. | | | | | | | Comparative sample No. | |
|---|---|---|---|---|---|---|---|---|---|
|  | 1 | 2 | 3 | 4 | 5 | 6 | 7 | 1 | 2 |
| Perlite (cm$^3$) | 1000 | 1000 | 1000 | 1000 | 1000 | 1000 | 1000 | 1000 | 1000 |
| Ordinary cement (g) | 100 | 120 | 120 | 120 | 140 | 120 | 120 | 120 | 140 |
| Rubber *(g) Latex solid component | 20 | 5 | 9 | 12 | 10 | 9 | 9 | — | — |
| Compression ratio | 1.25 | 1.25 | 1.25 | 1.25 | 1.25 | 1.20 | 1.30 | 1.25 | 1.25 |

*JSR 0670: Trade name of Rubber latex manufactured by Japan Synthetic Rubber Co. Ltd.

Table 2

| | | Normal Incident Sound Absorption Coefficient (%) | | | | | | | | | | | | | | | | |
|---|---|---|---|---|---|---|---|---|---|---|---|---|---|---|---|---|---|---|
| | | Under Dry Condition | | | | | | | | | Under Water Absorbed Condition | | | | | | | | |
| | | Sample No. | | | | | | | Comparative sample No. | | Sample No. | | | | | | | Comparative sample No. | |
| | | 1 | 2 | 3 | 4 | 5 | 6 | 7 | 1 | 2 | 1 | 2 | 3 | 4 | 5 | 6 | 7 | 1 | 2 |
| ⅓ Octave band frequency (Hz) | 250 | 41 | 41 | 42 | 42 | 43 | 40 | 44 | 41 | 42 | 22 | 21 | 22 | 24 | 21 | 22 | 20 | 19 | 16 |
| | 315 | 57 | 59 | 60 | 60 | 61 | 57 | 63 | 59 | 60 | 35 | 34 | 35 | 36 | 34 | 36 | 33 | 31 | 28 |
| | 400 | 77 | 79 | 80 | 79 | 79 | 78 | 83 | 79 | 78 | 53 | 50 | 52 | 54 | 49 | 54 | 49 | 47 | 42 |
| | 500 | 99 | 99 | 99 | 98 | 97 | 100 | 96 | 100 | 98 | 76 | 72 | 74 | 77 | 72 | 77 | 70 | 68 | 64 |
| | 630 | 93 | 95 | 94 | 94 | 92 | 92 | 96 | 94 | 91 | 100 | 95 | 96 | 98 | 96 | 99 | 92 | 99 | 99 |
| | 800 | 83 | 86 | 86 | 87 | 88 | 84 | 90 | 86 | 87 | 72 | 79 | 78 | 76 | 78 | 74 | 82 | 73 | 77 |
| | 1000 | 91 | 98 | 99 | 99 | 100 | 92 | 100 | 98 | 100 | 84 | 83 | 84 | 83 | 85 | 81 | 84 | 83 | 84 |
| | 1250 | 99 | 92 | 91 | 93 | 92 | 100 | 94 | 91 | 91 | 100 | 99 | 100 | 98 | 99 | 98 | 97 | 100 | 100 |
| | 1600 | 87 | 88 | 89 | 91 | 93 | 89 | 92 | 89 | 90 | 92 | 92 | 92 | 90 | 89 | 90 | 90 | 90 | 92 |
| | 2000 | 90 | 96 | 94 | 94 | 97 | 91 | 95 | 97 | 96 | 90 | 94 | 91 | 93 | 87 | 89 | 86 | 84 | 85 |
| Water absorbing factor | | | | | | | | | | | 9.8 | 13.7 | 12.6 | 11.1 | 11.0 | 10.9 | 13.1 | 15.3 | 16.1 |

*Water absorption conditions: The sample was completely immersed into water for 24 hours and after taking out of water was left as it was for 1 hour.

*Water absorptivity (vol.%): $\left( \dfrac{\text{(Weight of sample under water absorbed condition)} - \text{(Weight of sample under dry condition)}}{\text{Volume of sample}} \right) \times 100\,(\%)$ As seen from Table 2, the acoustic absorptivity for normal incident sound of the sound absorbing plate according to the invention is high for a wide frequency range both under dry and water absorbed conditions.

Figure 3:
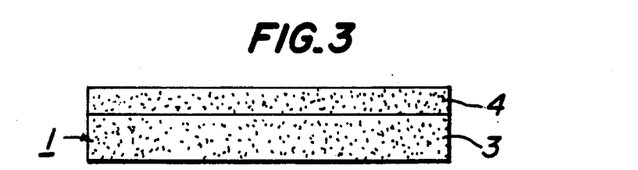
FIG. 3 is a cross-sectional view of another embodiment of a sound absorbing plate according to the invention.

FIG. 3 shows another embodiment of a perlite sound absorbing plate 1 according to the invention. The perlite sound absorbing plate 1 shown in FIG. 3 is composed of a sound absorbing substrate 3 containing aggregate formed of perlite particles and a surface reinforcing layer 4 mainly consisting of expanded shale. The sound absorbing plate 1 as a whole is of porous body having an air permeability.

Figure 4:
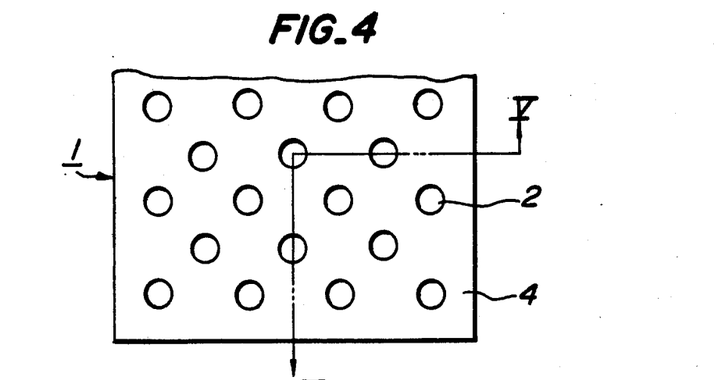
FIG. 4 is a front elevational view of a further embodiment of a sound absorbing plate according to the invention.
Figure 5:
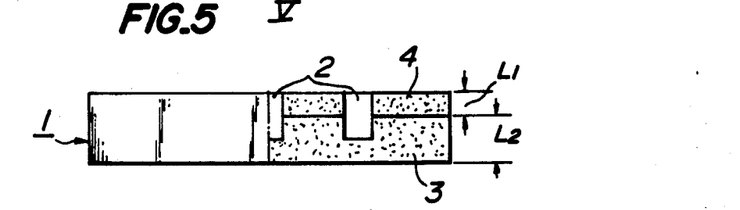
FIG. 5 is a cross-sectional view taken along the line V—V of FIG. 4.

In an embodiment shown in FIGS. 4 and 5, the sound absorbing plate 1 is provided at its surface reinforcing layer side facing a sound source with a plurality of sound absorbing cavities 2.

It is preferable to make the thickness of the sound absorbing plate a range between 80 mm and 120 mm. In the embodiment shown in FIGS. 4 and 5, the sound absorbing plate 1 is provided with a plurality of sound absorbing cavities 2 each having a diameter from 20 to 50 mm and a depth from 30 mm to 90 mm, a ratio of total area of the cavities to the total area of the sound absorbing plate being at most 40%.

Each of the foamed perlite particles for constituting the sound absorbing substrate 3 has a diameter of 0.1 mm to 0.7 mm and bulk specific gravity of 0.07 to 0.25, preferably on the order of 0.10 to 0.15. In order to bond such perlite particles together, 100 to 140 g of cement is used to 1,000 cm$_3$ by bulk volume of the foamed perlite particles.

The surface reinforcing layer 4 mainly consists of expanded shale having a bulk specific gravity of 0.7 to 1.5 and a particle diameter of at most 7 mm.

The perlite particles are obtained by foaming and sintering perlite, obsidian or the like and each has a bulk specific gravity of 0.07 to 0.25. As a result, the bulk specific gravity of the surface reinforcing layer 4 is 2 to 10 times larger than that of the perlite particles and hence it is possible to improve the mechanical strength of the surface reinforcing layer 4. But, the expanded shale constituting the surface reinforcing layer 4 is deficient in the water absorbing property, so that the surface reinforcing layer 4 must use, as its bonding agent, 140 to 180 g of cement to 1,000 cm$^3$ by bulk volume of the reinforcing aggregate, the amount of cement used being slightly larger than that used for the perlite particles. If the amount of the bonding agent is increased, it is possible to further improve the mechanical strength of the surface reinforcing layer 4, but the acoustic absorptivity becomes decreased. Thus, it is not desirous to considerably increase the amount of bonding agent.

A small amount of foamed lightweight aggregate such as perlite particles, Sirasu baloon or the like may be added into the surface reinforcing layer 4 for the purpose of improving the bonding force between the reinforcing aggregates. A ratio of such foamed lightweight aggregate to the reinforcing aggregate is at most 1, preferably at most 0.4.

In the case of bonding the foamed lightweight aggregate together by cement, a certain amount of high molecular emulsion may be added thereto so as to improve the bonding force of the cement. In this case, it is preferable to add the emulsion to the cement with a ratio of 5 to 20 parts by weight of solid ingredients of the emulsion to 100 parts by weight of cement. Since the sound absorbing plate provided at its upper surface with the surface reinforcing layer added with the emulsion does substantially not deteriorate its acoustic absorptivity, it is desirous to use such sound absorbing plate. In addition, the expanded shale mainly consisting of the surface reinforcing layer 4 may be replaced by various kinds of synthetic lightweight aggregate having a bulk specific gravity of 0.7 to 1.5, if necessary.

The above mentioned sound absorbing substrate mixture and surface reinforcing layer mixture are prepared separately and charged into a metal mold having a configuration matched with the sound absorbing plate in succession and then molded into one integral body and subsequently cured into a plate.

As shown in FIG. 5, it is not desirous to make the thickness $L_2$ of the surface reinforcing layer 4 considerably large relative to the thickness $L_1$ of the sound absorbing substrate 3 of the perlite sound absorbing plate 1 for the purpose of maintaining the sound absorbing property thereof high in level. This ratio of $L_2$ to $L_1$ should be smaller than 1. On the contrary, if this ratio becomes too small, it is difficult to mold these two layers into one integral body. It is preferable to make the ratio $L_2/L_1$ a range between 0.2 and 0.4.

As stated hereinbefore and to be described with reference to the following example, the embodiment shown in FIGS. 4 and 5 can retain the high sound absorbing property of the perlite sound absorbing substrate 3 and can sufficiently exhibit the characteristic of the expanded shale that can improve the surface mechanical strength of the perlite sound absorbing substrate and provides the important advantage that provision is made of a perlite sound absorbing plate which is excellent in sound absorbing property, mechanical strength and durability and which is significantly adapted for use in material for preventing public nuisance caused by noise.

The compressive strength of the perlite sound absorbing plate provided at its upper surface with the surface reinforcing layer shown in FIGS. 4 and 5 was measured by a testing machine and compared with that of the perlite sound absorbing plate per se shown in FIGS. 1 and 2. Such comparative tests have demonstrated the result that compressive strength of the perlite sound absorbing plate provided at its upper surface with the surface reinforcing layer shown in FIGS. 4 and 5 is 2 to 10 times larger than that of the perlite sound absorbing plate per se shown in FIGS. 1 and 2. As a result, the use of the surface reinforcing layer on the upper surface of the perlite sound absorbing plate ensures a remarkable improvement of the surface mechanical strength of the perlite sound absorbing plate.

Figure 6:
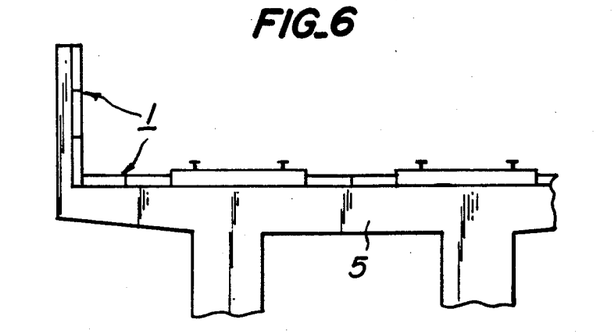
FIG. 6 is a diagrammatic cross-sectional view of an elevated railroad on which are arranged sound absorbing plates according to the invention.

The surface reinforced perlite sound absorbing plate has a durability which is sufficiently resistant to wear due to a foot-passenger's walk. As a result, the surface reinforced perlite sound absorbing plate may not only be mounted on the side wall provided on an elevated railroad 5 or the like, but also be arranged as a road base sound absorbing material on the elevated railroad 5 near the track as shown in FIG. 6, thereby significantly enlarging the use of the perlite sound absorbing plate.

The embodiment shown in FIGS. 4 and 5 will now be described with reference to the following example 2.

EXAMPLE 2

A surface reinforced perlite sound absorbing plate 1 shown in FIGS. 4 and 5 and having a dimension 500 mm (length)×500 mm (width)×100 mm (depth) was produced from composition shown in the following Table 3. The plate was provided at its upper surface with a plurality of sound absorbing cavities 2 each having a dimension of 40 mm (diameter)×60 mm (depth). A columnar body having a dimension of 97 mm (diameter)×100 mm (thickness) and provided about its center with the sound absorbing cavities was cut out of the plate. The normal incident sound absorption coefficient of the columnar body was measured. As a comparative example, the normal incident acoustic absorptivity of the perlite sound absorbing plate per se and having a thickness of 100 mm was also measured.

The result is shown in the following Table 4. In the Table 4, the water absorbed condition shall be understood to mean that the sample was completely immersed into water for 24 hours and then taken out of water and left as it was for 1 hour.

Table 3

| | | Sample No. | | | | | Comparative sample |
|---|---|---|---|---|---|---|---|
| | | 1 | 2 | 3 | 4 | 5 | |
| Perlite sound absorbing substrate | Thickness (mm) | 80 | 80 | 80 | 60 | 60 | 100 |
| | Ratio of cement to perlite | 0.14 | 0.14 | 0.14 | 0.14 | 0.14 | 0.14 |
| Surface reinforcing layer | Thickness (mm) | 20 | 20 | 20 | 40 | 40 | |
| | Ratio of perlite to expanded shale | 0/10 | 2/8 | 2/8 | 0/10 | 2/8 | |
| | Ratio of cement to perlite and shale | 0.16 | 0.16 | 0.16 | 0.16 | 0.16 | |
| | Ratio of SBR latex to cement (parts by weight) | 0 | 0 | 10 | 0 | 10 | |

Perlite : Particle diameter of 1 to 7 mm. Bulk specific gravity of 0.14
Expanded shale : Particle diameter of 2 to 7 mm. Bulk specific gravity of 1.40.

Table 4

| | | Normal Incident Sound Absorption Coefficient (%) | | | | | | | | | | |
|---|---|---|---|---|---|---|---|---|---|---|---|---|
| | | Under dry condition | | | | | | Under water absorbed condition | | | | |
| | | Sample No. | | | | | Comparative sample | Sample No. | | | | Comparative sample |
| | | 1 | 2 | 3 | 4 | 5 | | 1 | 2 | 3 | 4 | 5 | |
| ⅓ Octave | 250 | 36 | 33 | 28 | 40 | 39 | 35 | 16 | 16 | 20 | 14 | 21 | 19 |
| | 315 | 57 | 48 | 43 | 65 | 63 | 50 | 22 | 21 | 35 | 24 | 27 | 25 |
| | 400 | 85 | 80 | 72 | 92 | 89 | 82 | 38 | 37 | 64 | 39 | 57 | 44 |

Table 4-continued

| | | Normal Incident Sound Absorption Coefficient (%) | | | | | | | | | | |
|---|---|---|---|---|---|---|---|---|---|---|---|---|
| | | Under dry condition | | | | | | Under water absorbed condition | | | | |
| | | Sample No. | | | | | Compara-tive | Sample No. | | | | | Compara-tive |
| | | 1 | 2 | 3 | 4 | 5 | sample | 1 | 2 | 3 | 4 | 5 | sample |
| band frequency (Hz) | 500 | 99 | 98 | 96 | 94 | 96 | 99 | 70 | 77 | 99 | 74 | 98 | 74 |
| | 630 | 82 | 90 | 87 | 79 | 82 | 89 | 95 | 96 | 80 | 81 | 79 | 89 |
| | 800 | 80 | 82 | 77 | 75 | 77 | 84 | 84 | 85 | 72 | 72 | 70 | 73 |
| | 1000 | 84 | 91 | 80 | 84 | 82 | 86 | 76 | 77 | 84 | 70 | 73 | 74 |
| | 1250 | 99 | 99 | 98 | 99 | 98 | 98 | 98 | 98 | 96 | 99 | 99 | 98 |
| | 1600 | 79 | 85 | 84 | 90 | 85 | 84 | 84 | 95 | 80 | 80 | 81 | 76 |
| | 2000 | 76 | 78 | 70 | 72 | 76 | 80 | 70 | 71 | 69 | 70 | 72 | 78 |

As seen from the test result shown in the Table 4, in all samples, the decrease of the acoustic absorptivity due to the presence of the surface reinforcing layer is small. The sound absorbing property required for the perlite sound absorbing plate, that is, the acoustic absorptivity over a wide frequency range of 0.5 to 2 KHz is at least 70% and superior to that of the comparative sample which is not provided with the surface reinforcing layer both under dry and water absorbed conditions.

In a further embodiment of the invention, provision is made of a perlite sound absorbing plate having a high mechanical strength and composed of a mixture including 1,000 cm$^3$ by bulk volume of an aggregate produced by mixing expanded shale having a diameter of 0.1 mm to 5 mm with foamed perlite particles each having a diameter of 0.1 mm to 7 mm with a bulk ratio of 0.4 to 2.5, 120 g to 160 g of cement, liquid rubber latex containing 5 g to 20 g of solid ingredients and a suitable amount of water and produced by agitating said mixture, charging said agitated mixture into a desired metal mold and press molding to form a molded plate and curing and hardening said molded plate into a final plate.

In the present embodiment, it is preferable to use, as the foamed perlite particles, formed obsidian having a particle diameter of 0.1 to 7 mm. The foamed perlite particles having a bulk specific gravity on the order of 0.12 to 0.20 and available in market is preferably of a class in which the foamed perlite particles are hard and heavy in weight.

The expanded shale particles preferably has a particle diameter of 0.1 mm to 5 mm and a bulk specific gravity on the order of 0.7 to 1.3.

The sound absorbing property of the perlite particles is superior to that of the expanded shale particles, while the mechanical strength of the expanded shale particles is superior to that of the perlite particles. The expanded shale particles are inferior in water absorbing property to the perlite particles, so that the expanded shale particles function to prevent the sound absorbing property of the sound absorbing plate under water absorbed condition from deteriorating. By taking the above described merits and demerits of the perlite and expanded shale particles into consideration, a bulk ratio of the expanded shale particles to the perlite particles is made 0.4 to 2.5 for the purpose of improving the mechanical strength of the perlite sound absorbing plate.

If the bulk ratio is smaller than 0.4, the mechanical strength of the perlite sound absorbing plate could not be improved. On the contrary, if the bulk ratio is larger than 2.5, the press molding becomes difficult and the sound absorbing property of the perlite sound absorbing plate becomes considerably degraded.

The amount of cement for bonding the aggregate is made 120 to 160 g with respect to 1,000 cm$^3$ by bulk volume of the aggregate. If the amount of cement is smaller than 120 g, the sound absorbing property of the perlite sound absorbing plate becomes deteriorated over a high frequency range and the force for bonding together the aggregate composition becomes weak whereby it is impossible to improve the mechanical strength of the perlite sound absorbing plate. On the contrary, if the amount of cement is larger than 160 g, the bonding effect between the aggregate compositions becomes strong and hence it is possible to improve the mechanical strength of the perlite sound absorbing plate, but the gap between the particles of the porous aggregate becomes decreased, thereby degrading the sound absorbing property of the perlite sound absorbing plate.

In the present embodiment, it is preferable to use the liquid rubber latex containing 5 g to 20 g of solid ingredients and having an adhesive property. Such liquid rubber latex functions to firmly bond together the aggregate ingredients and dehydrate under the water absorbed condition, whereby the acoustic absorptivity of the perlite sound absorbing plate under the water absorbed condition is made superior to that of the conventional perlite sound absorbing plate.

The more the liquid rubber latex is added the more the mechanical strength of the perlite sound absorbing plate is improved. But, the amount of the liquid rubber latex to be added must be made within a suitable range by taking the gap between the aggregate particles into consideration.

In general, in order to prevent the acoustic absorptivity of the perlite sound absorbing plate from deteriorating, it is preferable to make the upper limit of the amount of liquid rubber latex to be added smaller as the amount of cement to be added becomes larger. For example, if 140 g of cement is added to 1,000 cm$^3$ by bulk volume of aggregate, the upper limit of the liquid rubber latex to be added is made 16 g on the basis of the solid ingredients. It is possible to mold the aggregate without adding the liquid rubber latex. In this case, however, the aggregate particles tend to be dropped off and the acoustic absorptivity of the perlite sound absorbing plate under the water absorbed condition becomes degraded over a low frequency range.

In the case of forming the perlite sound absorbing plate according to the present embodiment in the first place, given amounts of the above described various materials are prepared, respectively. Then, the perlite particles are mixed with the expanded shale particles in a mixer, preferably a rotary drum type mixer to obtain a mixture to which is added cement. The mixture is then agitated to obtain a mixture to which is added a suitable amount of water and a diluted liquid rubber latex and the whole is agitated to obtain a mixed material. The mixed material is charged into a metal mold and press molded to provide a plate. In this case, it is preferable to charge the mixed material into an oscillating metal mold as in the case of the previous embodiment.

Similar to the previous embodiment if the mixed material whose volume is 1.10 to 1.30 times larger than the volume of the plate is charged into the metal mold and during the press molding, if the pressure is applied to the rear surface of the plate, it is possible to provide a perlite sound absorbing plate which is excellent in both the sound absorbing property and the mechanical strength.

The molded plate thus obtained is cured under humid air or steam vapor and hardened into a perlite sound absorbing plate.

As shown in FIGS. 1 and 2, if the above mentioned perlite sound absorbing plate is provided with a plurality of sound absorbing cavities different in diameter from 20 to 50 mm and in depth from 30 to 90 mm, it is possible to improve its sound absorbing property over a wide frequency range and its mechanical strength.

A perlite sound absorbing plate having a thickness of 100 mm and provided with two kinds of sound absorbing cavities having dimension of 30 mm (diameter)×40 mm (depth) and 30 mm (diameter)×80 mm (depth) has a normal incident acoustic absorptivity of at least 70% under water absorbed condition over a wide frequency range from 0.5 to 2.0 KHz.

In the present embodiment, the perlite sound absorbing plate effectively utilizes the physical property of the expanded shale and liquid rubber latex and correctly selects a ratio of the cement bonding agent to the aggregate particles such that its sound absorbing property can be maintained at a high level and that its mechanical strength, particularly compressive strength can be made 2 to 10 times higher than that of the conventional sound absorbing plate, and that the drawbacks inherent to the perlite sound absorbing plate can completely be obviated. As a result, the present embodiment is particularly suitable as a sound absorbing plate to be used in outdoors and has resistance to wear against foot-passenger's walk and hence can be used as a floor sound absorbing plate for a railroad or the like.

The present embodiment will now be described with reference to the following example 3.

EXAMPLE 3

A sound absorbing plate having a thickness of 100 mm was produced from compositions shown in the following Table 5. The plate was provided at its sound incident surface with a plurality of two kinds of sound absorbing cavities of 30 mm (diameter)×40 mm (depth) and 30 mm (diameter)×80 mm (depth). A columnar body having a dimension of 97 mm (diameter)×100 mm (height) was cut out of the plate with the two kinds of cavities located about its center. The normal incident sound absorption coefficient of the columnar body was measured. The result is shown in the following Table 6. The mixed materials were charged into the metal mold under oscillatory condition and press molded with a compression ratio of 1.25 and immediately thereafter was removed from the mold and cured under steam vapor at 90° C. for 3 hours to produce the plate.

Table 5

|  |  | Sample No. | | | | | | | Comparative sample |
|---|---|---|---|---|---|---|---|---|---|
|  |  | 1 | 2 | 3 | 4 | 5 | 6 | 7 |  |
| Aggregate | Perlite (cm³) | 700 | 500 | 400 | 300 | 500 | 500 | 500 | 1000 |
|  | Expanded shale (cm³) | 300 | 500 | 600 | 700 | 500 | 500 | 500 | — |
| Ordinary cement (g) |  | 140 | 140 | 140 | 140 | 120 | 120 | 160 | 140 |
| Rubber latex solid component (g) |  | 14 | 14 | 14 | 14 | 5 | 20 | 16 | 14 |

Note:
Perlite: Available in market by the trade name of "Fuyolite No. 5" and manufactured by Fuyolite Co., Ltd. in Japan.
Expanded shale: Available in market by the trade name of "Messalite Intermediate Aggregate" and manufactured by Mitsui Metal Industrial Co., Ltd. in Japan.
Rubber Latex: Available in market by the trade name of "JSR 0670" and manufactured by Japan Synthetic Rubber Co., Ltd.

Table 6

| | | Normal Incident Sound Absorption Coefficient (%) | | | | | | | | | | | | | | | |
|---|---|---|---|---|---|---|---|---|---|---|---|---|---|---|---|---|---|
| | | Dry condition | | | | | | | | Water absorbed condition | | | | | | | |
| | | Sample No. | | | | | | | Comparative Sample | Sample No. | | | | | | | Comparative Sample |
| | | 1 | 2 | 3 | 4 | 5 | 6 | 7 | | 1 | 2 | 3 | 4 | 5 | 6 | 7 | |
| ⅓ Octave band frequency (Hz) | 250 | 49 | 48 | 47 | 45 | 50 | 48 | 45 | 49 | 24 | 23 | 23 | 21 | 24 | 23 | 20 | 24 |
| | 315 | 71 | 70 | 69 | 67 | 72 | 70 | 68 | 70 | 34 | 33 | 32 | 30 | 35 | 33 | 29 | 35 |
| | 400 | 89 | 87 | 86 | 84 | 90 | 88 | 89 | 88 | 62 | 60 | 59 | 55 | 61 | 59 | 50 | 62 |
| | 500 | 98 | 98 | 98 | 97 | 97 | 100 | 99 | 99 | 97 | 96 | 95 | 93 | 100 | 97 | 89 | 98 |
| | 630 | 90 | 92 | 93 | 94 | 90 | 92 | 91 | 91 | 86 | 85 | 87 | 90 | 85 | 85 | 82 | 85 |
| | 800 | 79 | 78 | 77 | 76 | 77 | 78 | 80 | 79 | 76 | 75 | 75 | 74 | 72 | 74 | 72 | 76 |
| | 1000 | 82 | 80 | 79 | 77 | 80 | 81 | 84 | 83 | 77 | 76 | 75 | 73 | 70 | 75 | 70 | 78 |
| | 1250 | 98 | 99 | 97 | 96 | 100 | 98 | 99 | 99 | 99 | 100 | 98 | 97 | 97 | 98 | 98 | 99 |

Table 6-continued

| | | Normal Incident Sound Absorption Coefficient (%) | | | | | | | | | | | | | | |
|---|---|---|---|---|---|---|---|---|---|---|---|---|---|---|---|---|
| | | Dry condition | | | | | | | | Water absorbed condition | | | | | | |
| | | Sample No. | | | | | | | Comparative Sample | Sample No. | | | | | | Comparative Sample |
| | | 1 | 2 | 3 | 4 | 5 | 6 | 7 | | 1 | 2 | 3 | 4 | 5 | 6 | 7 | |
| | 1600 | 90 | 90 | 88 | 86 | 93 | 90 | 90 | 92 | 87 | 86 | 84 | 80 | 79 | 84 | 80 | 88 |
| | 2000 | 85 | 83 | 83 | 80 | 86 | 88 | 79 | 84 | 77 | 75 | 77 | 75 | 72 | 74 | 71 | 78 |

Note:
Water absorption condition: The sample was completely immersed into water for 24 hours and after taking out of water was left as it was for 1 hour.

As seen from the Table 6, as the amount of the expanded shale added to the aggregate is increased, the sound absorbing property of the perlite sound absorbing plate becomes slightly decreased. Such decrease is not so large as compared with that of the perlite particles per se (comparative example). That is, the addition of the expanded shale increases the density of the aggregate, but the influence due to the presence of the expanded shale is small. The presence of the expanded shale effectively contributes to the perlite sound absorbing plate under water absorbed condition.

EXAMPLE 4

Compressive strength of the sample shown in the Example 3 was measured and the result is shown in the following Table 7. The testing machine was an Instron testing machine whose crosshead speed was made 10 mm/min.

Table 7

| | Sample No. | | | | | | | Comparative sample |
|---|---|---|---|---|---|---|---|---|
| | 1 | 2 | 3 | 4 | 5 | 6 | 7 | |
| Compressive strength (kg/cm$^2$) | 9.1 | 19 | 31 | 68 | 16 | 20 | 27 | 7.2 |

As seen from the Table 7, the use of large amount of the expanded shale ensures a significant increase of the compressive strength of the perlite sound absorbing plate, thereby improving the mechanical strength of the latter.

EXAMPLE 5

Figure 7:
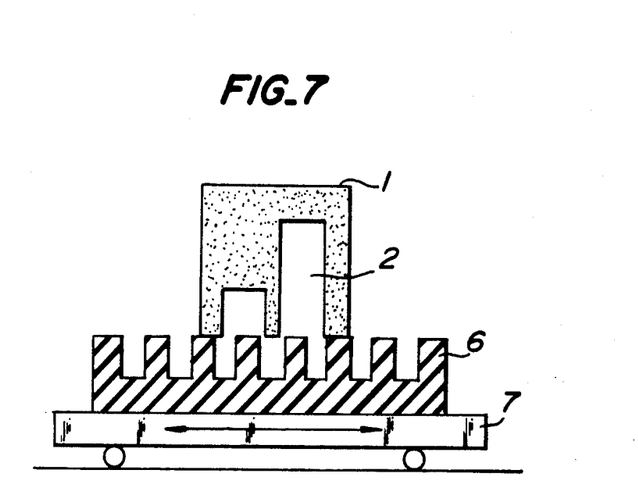
FIG. 7 is a diagrammatic cross-sectional view of a sound absorbing columnar body cut out of the sound absorbing plate shown in FIG. 2 and an abrasion testing machine for testing the surface stability of the sound absorbing columnar body.

The stability of the surface of the perlite sound absorbing plate was evaluated by a wear testing machine shown in FIG. 7. Referring to FIG. 7, reference numeral 1 designates a perlite sound absorbing columnar body having a dimension of 97 mm (diameter)×100 mm (height) (refer to Example 3), 2 a sound absorbing cavity provided in the columnar body 1 and having two kinds of dimensions of 30 mm (diameter)×40 mm (depth) and 30 mm (diameter)×80 mm (depth), 6 a wear testing member composed of urethane rubber screen and firmly fixed on a carriage 7. The sound absorbing columnar body 1 was fixed such that that surface thereof which is provided with the sound absorbing cavities 2 makes contact with the surface of the testing member 6. Then, the sound absorbing columnar body 1 was subjected to a given load and the carriage 7 was moved in right and left directions 100 times as shown by arrows in FIG. 7. During such reciprocating motion of the carriage 7, the number of the dropped surface particles and the amount of wear were measured. The result is shown in the following Table 8.

Table 8

| | Sample No. | | | | | | | Comparative sample |
|---|---|---|---|---|---|---|---|---|
| | 1 | 2 | 3 | 4 | 5 | 6 | 7 | |
| Number of dropped surface particles | 1 | 0 | 0 | 0 | 0 | 0 | 0 | 1 |
| Amount of wear (g) | 14 | 1.1 | 0.8 | 0.3 | 1.8 | 0.7 | 0.7 | 32 |

As seen from the the Table 8, the use of large amount of the expanded shale ensures a significant improvement in the surface stability. In addition, the use of large amount of the rubber latex ensures a further improvement in the surface stability.

The above described perlite sound absorbing plate according to the invention is particularly usable as a main constitutional member of a sound insulating wall.

Such sound insulating wall will now be described with reference to FIGS. 8 to 17.

Figure 8:
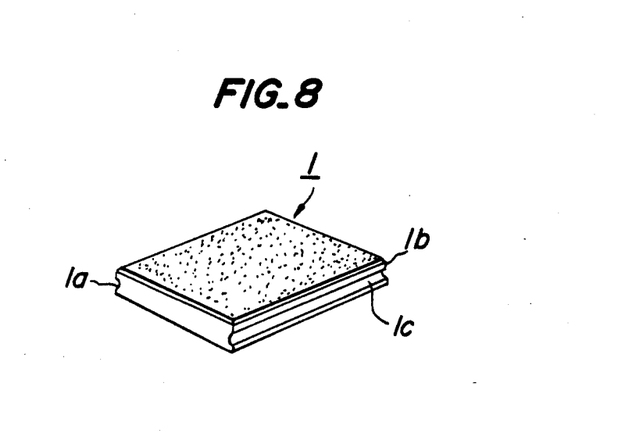
FIG. 8 is a perspective view of a perlite sound absorbing plate according to the invention mainly constituting a sound insulating wall.

As shown in FIG. 8, the perlite sound absorbing plate 1 is provided at side edges 1b, 1b, with grooves 1a, 1a, respectively.

Figure 9:
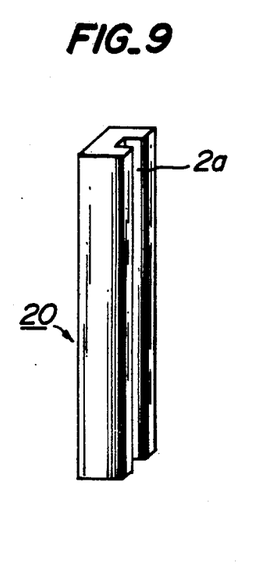
FIGS. 9 and 10 are perspective views of end and intermediate supporting columns adapted to be engaged with the sound absorbing plate shown in FIG. 8 for the purpose of constructing a sound insulating wall, respectively.
Figure 10:
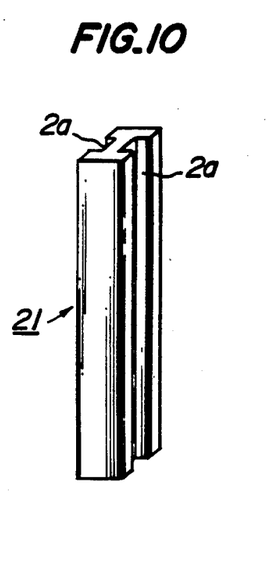

FIGS. 9 and 10 show supporting columns 20, 21, respectively. The supporting column 20 shown in FIG. 9 constitutes one of spaced apart end supporting column located at both ends of a sound insulating wall to be set in place. The end supporting column 20 is provided at its one side surface with a groove 2a.

The supporting column 21 shown in FIG. 10 constitutes an intermediate supporting column located intermediate between the spaced apart end supporting columns 20, 20 shown in FIG. 9 and provided at its both side surfaces with grooves 2a, 2a, respectively. The supporting columns 20, 21 may be formed of iron or concrete, but it is preferable to use the concrete supporting column having a durability which is higher than that of the iron supporting column.

Figure 11:
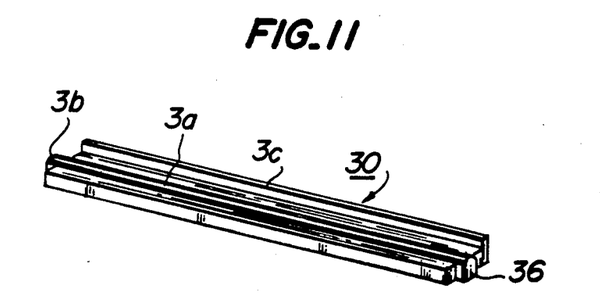
FIGS. 11 and 12 are perspective views of lower and intermediate reinforcing plates adapted to be assembled together with the sound absorbing plate shown in FIG. 8 for the purpose of constructing a sound insulating wall, respectively.
Figures 12, 13:
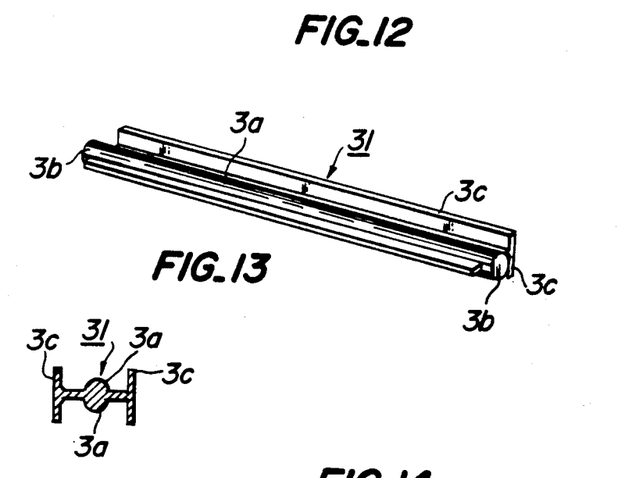
FIG. 13 is a cross-sectional view of another embodiment of the intermediate reinforcing plate shown in FIG. 12.

FIGS. 11 and 12 show reinforcing plates 30, 31. The reinforcing plate 30 shown in FIG. 11 is arranged on foundation ground and on the top of the sound insulating wall. The reinforcing plate 30 is provided at its upper surface with a ridge 3a adapted to be engaged with the groove 1a provided on the side edge of the perlite sound absorbing plate 1 and provided at its both ends with projections 3b, 3b adapted to be engaged with the grooves 2a, 2a of the end and intermediate supporting columns 2, 20. In addition, the reinforcing plate 30 is provided at its rear side with an upwardly projecting side flange 3c. The reinforcing plate 30 is made upside down and used as the uppermost reinforcing plate of the sound insulating wall.

FIG. 12 shows an intermediate reinforcing plate 31 adapted to be sandwiched between the upper and lower sound absorbing plates 1, 1. The intermediate reinforcing plate 31 is different from the end reinforcing plate 30 that the ridge 3a is projected upwardly and downwardly and the side flange 3c is projected upwardly and downwardly. As shown in FIG. 13, the intermediate reinforcing plate 31 may be provided at its front and rear side edges with side flanges 3c, 3c.

These reinforcing plate 30, 31 may be directly extruded from an extruding machine or formed by molding concrete into a metal mold. The reinforcing plates 30, 31 may be reinforced by iron bars embedded therein.

The above mentioned sound absorbing material 1, supporting columns 20, 21 and reinforcing plates 30, 31 may be assembled together into a sound insulating wall in the following steps.

Figure 14:
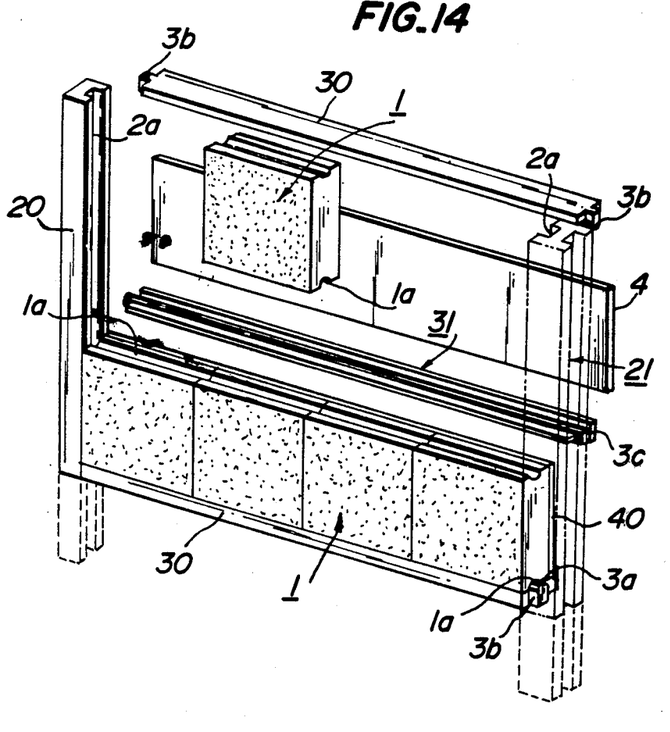
FIG. 14 is a perspective view illustrating successive steps of constructing a sound insulating wall with the aid of the perlite sound absorbing plate shown in FIG. 8, supporting columns shown in FIGS. 9 and 10 and reinforcing plates shown in FIGS. 11 and 12.

In the first place, as shown in FIG. 14, the end supporting columns 20 and 21 are spaced apart from each other by a proper distance and the lower end portions thereof are embedded into foundation ground as shown by dotted lines so as to vertically erect these columns on the foundation ground. Then, between the supporting columns 20, 21 is arranged the lower reinforcing plate 30 on the foundation ground with the ridge 3a faced upwardly. In this case, the projections 3b, 3b provided on the both ends of the lower reinforcing plate 30 engage with the grooves 2a, 2a of the supporting columns 20, 21.

In FIG. 14, the grooves 2a, 2a are shown as continuous grooves, but these grooves may be divided into a plurality of properly spaced apart grooves with one of which engages the lower reinforcing place 30 so as to prevent undesirous displacement thereof.

Subsequently, on the lower reinforcing plate 30 are superimposed a plurality of sound absorbing plates 1, 1 . . . arranged side by side. In this case, the side grooves 1a, 1a . . . of these sound absorbing plates 1, 1 . . . are brought into engagement with the ridge 3a provided on the upper surface of the lower reinforcing plate 30. Then, in the rear of the sound absorbing plates 1 and in parallel thereto is arranged a sound interrupting plate 40 formed of slate or concrete for the purpose of improving the sound interruption effect. Alternatively, in the first place, the sound interrupting plate 40 may be arranged in the rear of the sound absorbing plate 1.

Then, the intermediate reinforcing plate 31 is superimposed on the sound absorbing plates 1 and arranged in front of the sound interrupting plate 40.

Figure 15:
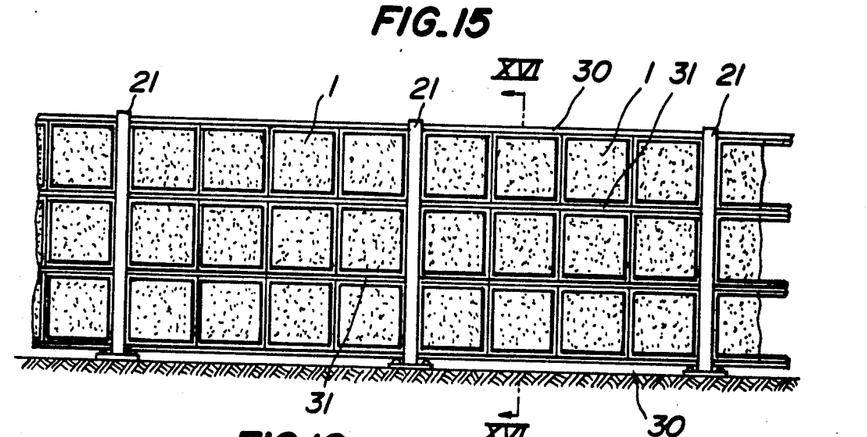
FIG. 15 is a front elevational view of a completed sound insulating wall.

The above described assembling operation is repeated so as to build up the sound absorbing plates 1 through the intermediate reinforcing plate 31 one upon the other. On the uppermost sound absorbing plate 1 is superimposed the upper reinforcing plate 30 with its ridge 3a faced downwardly and engaged with the side groove 1a. In this way, it is possible to construct a sound absorbing wall having any desired length and height at a location where any sound insulating or sound interrupting wall is absent with a minimum of time and labour. The sound insulating wall thus completed is shown in FIGS. 15 and 16.

The above described sound insulating wall does not require any bonding agent such as mortar or the like, but the side groove 1a of the sound absorbing plate 1, for example, may be painted with such bonding agent for the purpose of improving the mechanical strength of the sound insulating wall.

Figure 17:
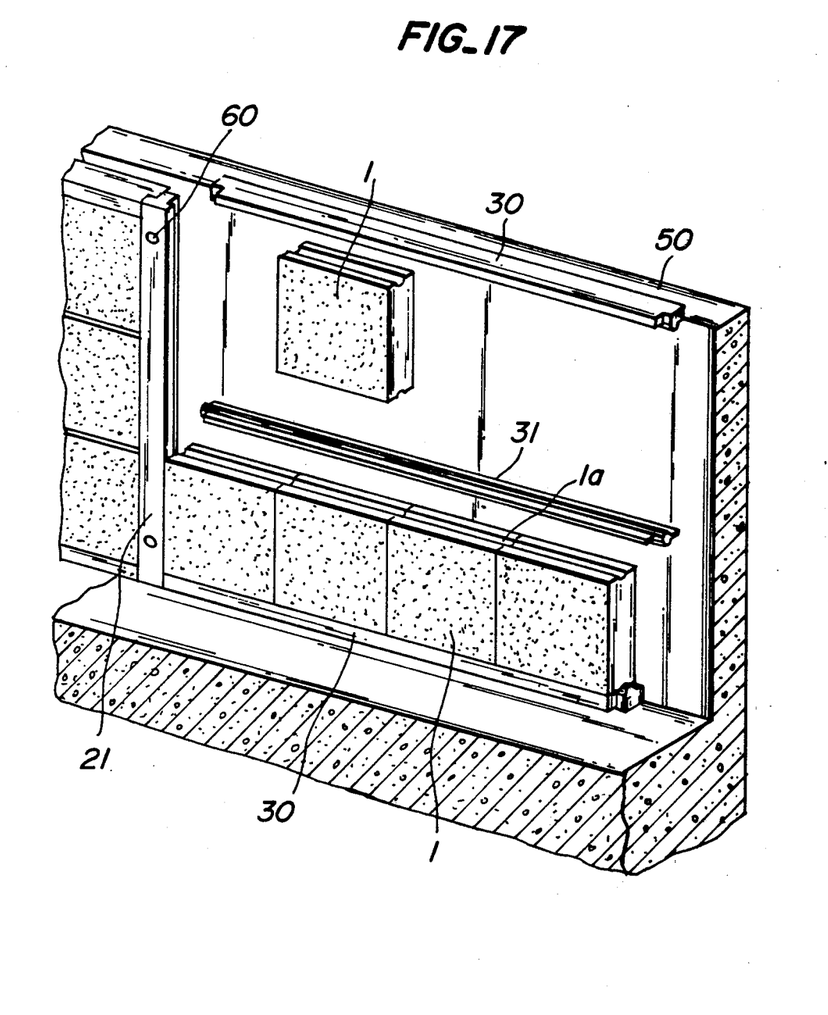
FIG. 17 is a perspective view illustrating successive steps of arranging a sound insulating wall along an existing sound interrupting wall.

The above described sound insulating wall may be assembled together with an existing sound interrupting wall 50 as shown in FIG. 17.

Figure 16:
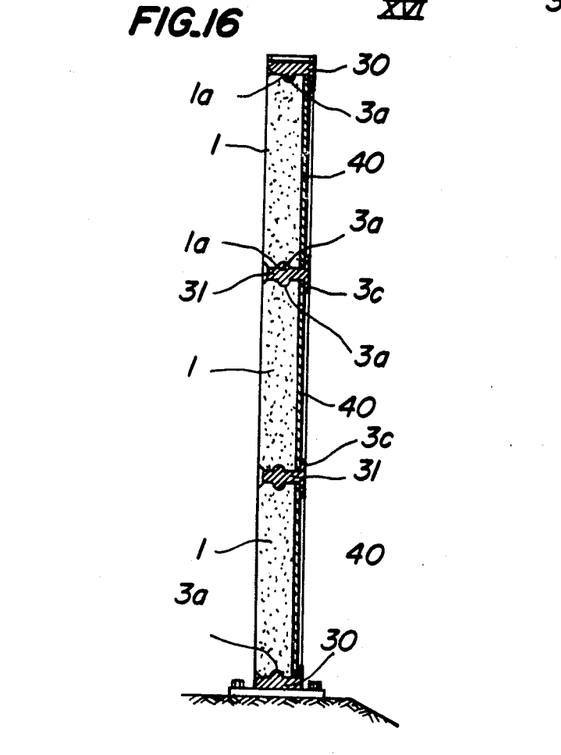
FIG. 16 is an enlarged cross-sectional view taken along the line XVI—XVI of FIG. 15.

In this case, since the existing sound interrupting wall 50 functions as the sound interrupting plate 40 shown in FIG. 16, the sound interrupting plate 40 may be omitted and the reinforcing plates 30, 31 are not required to be provided with the rear flange 3c as shown in FIGS. 11, 12 and 13. In the present example, the supporting columns 20, 21 are secured to the sound interrupting wall 50 by means of bolts 60 or the like.

The sound insulating wall constructed as above described has the advantages that it is formed of inorganic material instead of metals, so that it can eliminate a difficult problem of inducing rust which has been encountered with the conventional sound insulating wall formed of metals, that it is constructed by assembling together the sound absorbing plates 1 without using any bonding agent, so that it can be set in place with a minimum of time and labour, and that it can be arranged along the existing road or railroad.

What is claimed is:

1. A perlite sound absorbing plate composed of a mixture including 1,000 $cm^3$ by bulk volume of foamed perlite particles each having a diameter of 0.1 to 7.0 mm, 100 to 140 g of cement, liquid rubber latex containing 5 to 20 g of solid ingredients and a suitable amount of water and produced by agitating said mixture, charging said agitated mixture into a desired metal mold, press molding with a compression ratio of 1.10 to 1.30 to form a molded plate and curing and hardening said molded plate into a final plate.

2. The perlite sound absorbing plate according to claim 1, wherein said perlite sound absorbing plate is provided with a number of different kinds of sound absorbing cavities each having a diameter from 20 to 50 mm and a depth from 30 to 90 mm, a ratio of the total area of said cavities to the total area of said sound absorbing plate being at most 40%.

3. The perlite sound absorbing plate according to claim 1, wherein said perlite sound absorbing plate is provided at its sound incident side surface with a surface reinforcing layer composed of a reinforcing aggregate mainly consisting of expanded shale having a bulk specific gravity of 0.7 to 1.5 and bonded with said perlite sound absorbing plate by an inorganic bonding agent and after hardening made integral with said perlite sound absorbing plate.

4. A perlite sound absorbing plate composed of a mixture including 1,000 $cm^3$ by bulk volume of an aggregate produced by mixing expanded shale particles each having a diameter of 0.1 to 5 mm with foamed perlite particles each having a diameter of 0.1 to 7 mm with a bulk ratio of 0.4 to 2.5, 120 to 160 g of cement, liquid rubber latex containing 5 to 20 g of solid ingredients and a suitable amount of water and produced by agitating said mixture, charging said agitated mixture into a desired metal mold and press molding to form a molded plate and curing and hardening said molded plate into a final plate.

5. The perlite sound absorbing plate according to claim 4, wherein said perlite sound absorbing plate is provided with a number of different kinds of sound absorbing cavities each having a diameter from 20 to 50 mm and a depth from 30 to 90 mm, a ratio of the total area of said cavities to the total area of said sound absorbing plate being at most 40%.

6. A sound insulating wall comprising a plurality of equally spaced apart and vertically extending end and intermediate supporting columns each having a lower portion embedded in foundation ground and provided at its at least one side surface with a groove, a number of perlite sound absorbing plates each provided at its side surfaces with a side groove and arranged side by side in both horizontal and vertical directions, a plurality of equally spaced apart and horizontally extending upper, intermediate and lower reinforcing plates each provided at its at least one surface with a ridge engaged with said side groove of said perlite sound absorbing plate and at its both ends with projections engaged with said groove of said supporting column, said perlite sound absorbing plate being arranged side by side directly between said supporting columns in horizontal direction and through said intermediate reinforcing plate between said upper and lower reinforcing plates in vertical direction, and being composed of a mixture including 1,000 cm$^3$ by bulk volume of foamed perlite particles each having a diameter of 0.1 to 7.0 mm, 10 to 140 g of cement, liquid rubber latex containing 5 to 20 g of solid ingredients and a suitable amount of water and produced by agitating said mixture, charging said agitated mixture into a desired metal mold, press molding with a compression ratio of 1.10 to 1.30 to form a molded plate and curing and hardening said molded plate into a final plate.

7. The sound insulating wall according to claim 6, wherein said perlite sound absorbing plate is composed of a mixture including 1,000 cm$^3$ by bulk volume of an aggregate produced by mixing expanded shale particles each having a diameter of 0.1 to 5 mm with foamed perlite particles each having a diameter of 0.1 to 7 mm with a bulk ratio of 0.4 to 2.5, 120 to 160 g of cement, liquid rubber latex containing 5 to 20 g of solid ingredients and a suitable amount of water and produced by agitating said mixture, charging said agitated mixture into a desired metal mold and press molding to form a molded plate and curing and hardening said molded plate into a final plate.

* * * * *